(12) United States Patent
Xi et al.

(10) Patent No.: US 11,168,917 B2
(45) Date of Patent: Nov. 9, 2021

(54) AIR CONDITIONER, CONTROL METHOD THEREOF, CONTROL DEVICE THEREOF, AND COMPUTER-READABLE STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventors: Zhanli Xi, Foshan (CN); Wenduan Qi, Foshan (CN); Bobo Zhang, Foshan (CN); Meng Chen, Foshan (CN); Jun Liu, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 31 days.

(21) Appl. No.: 16/806,768

(22) Filed: Mar. 2, 2020

(65) Prior Publication Data

US 2020/0200425 A1 Jun. 25, 2020

Related U.S. Application Data

(63) Continuation of application No. PCT/CN2017/117883, filed on Dec. 22, 2017.

(30) Foreign Application Priority Data

Oct. 19, 2017 (CN) .......................... 201710989531.1
Oct. 19, 2017 (CN) .......................... 201710989621.0

(51) Int. Cl.
*F24F 11/77* (2018.01)
*F24F 11/76* (2018.01)
*G05B 19/042* (2006.01)

(52) U.S. Cl.
CPC .............. *F24F 11/77* (2018.01); *F24F 11/76* (2018.01); *G05B 19/042* (2013.01); *G05B 2219/2614* (2013.01)

(58) Field of Classification Search
CPC .. F24F 11/77; F24F 11/76; F24F 11/65; F24F 11/64; F24F 2110/10; G05B 19/042; G05B 2219/2614; Y02B 30/70
See application file for complete search history.

(56) References Cited

U.S. PATENT DOCUMENTS

| 4,271,898 A | 6/1981 | Freeman | |
|---|---|---|---|
| 2015/0198957 A1* | 7/2015 | Montero | G06F 3/04847 700/300 |
| 2018/0160564 A1* | 6/2018 | Fang | H05K 7/20136 |

FOREIGN PATENT DOCUMENTS

| CN | 1427212 A | 7/2003 |
|---|---|---|
| CN | 101963149 A | 2/2011 |

(Continued)

OTHER PUBLICATIONS

The European Patent Office (EPO) Extended Search Report for EP Application No. 17929126.5 dated Jul. 17, 2020 13 Pages.

(Continued)

*Primary Examiner* — Chad G Erdman
(74) *Attorney, Agent, or Firm* — Anova Law Group, LLC

(57) ABSTRACT

A control method of an air conditioner includes detecting an indoor ambient temperature value under a rapid cooling operation mode, judging whether the indoor ambient temperature value is greater than a preset temperature value, and in response to the indoor ambient temperature value being greater than the present temperature value, determining an operation temperature interval including the indoor ambient temperature value, determining a rapid cooling rotating speed value of an indoor fan of the air conditioner corresponding to the operation temperature interval, and control- (Continued)

ling the indoor fan to operate according to the rapid cooling rotating speed value. The rapid cooling rotating speed value is greater than a highest preset rotating speed value of the indoor fan.

12 Claims, 3 Drawing Sheets

(56) References Cited

FOREIGN PATENT DOCUMENTS

| CN | 102128481 | A | | 7/2011 | | |
| CN | 103216910 | A | | 7/2013 | | |
| CN | 103388880 | A | | 11/2013 | | |
| CN | 103629839 | A | * | 3/2014 | | |
| CN | 103747971 | A | | 4/2014 | | |
| CN | 104596055 | A | | 5/2015 | | |
| CN | 104613593 | A | | 5/2015 | | |
| CN | 104613601 | A | * | 5/2015 | ......... | F24F 2110/10 |
| CN | 105020855 | A | | 11/2015 | | |
| CN | 105042797 | A | | 11/2015 | | |
| CN | 105240987 | A | | 1/2016 | | |
| CN | 105890108 | A | | 8/2016 | | |
| CN | 106247565 | A | | 12/2016 | | |
| CN | 106288209 | A | * | 1/2017 | ............. | F24F 13/24 |
| CN | 106288209 | A | | 1/2017 | | |
| CN | 107062539 | A | | 8/2017 | | |
| CN | 107178835 | B | * | 6/2020 | ................ | F24F 3/14 |
| JP | S62258943 | A | | 11/1987 | | |
| JP | H09250798 | A | | 9/1997 | | |
| JP | H10318587 | A | | 12/1998 | | |

OTHER PUBLICATIONS

World Intellectual Property Organization (WIPO) International Search Report for PCT/CN2017/117883 dated Jul. 2, 2018 7 Pages(Translation Included).
The State Intellectual Property Office of PRC (SIPO) The First Office Action for CN Application No. 201710989621.0 dated Aug. 1, 2019 17 Pages (Translation Included ).
The State Intellectual Property Office of PRC (SIPO) The Second Office Action for CN Application No. 201710989531.1 dated Mar. 31, 2020 10 Pages (Translation Included ).
The State Intellectual Property Office of PRC (SIPO) The Second Office Action for CN Application No. 201710989621.0 dated Feb. 28, 2020 18 Pages (Translation Included ).
World Intellectual Property Organization (WIPO) Written Opinion for PCT/CN2017/117883 with translation dated Jul. 2, 2018 7 Pages.

* cited by examiner

AIR CONDITIONER, CONTROL METHOD THEREOF, CONTROL DEVICE THEREOF, AND COMPUTER-READABLE STORAGE MEDIUM

CROSS-REFERENCE TO RELATED APPLICATIONS

This application is a continuation of International Application No. PCT/CN2017/117883, filed Dec. 22, 2017, which claims priority to Chinese Patent Application Nos. 201710989621.0 and 201710989531.1, both filed Oct. 19, 2017, the entire contents of all of which are incorporated herein by reference.

FIELD

The present application relates to the technical field of air conditioners, and in particular, to an air conditioner, a control method thereof, a control device thereof, and a computer-readable storage medium.

BACKGROUND

With the rapid popularization, air conditioners deeply affect people's daily life and work. People have more and more requirements on the comfort of the air conditioners. When the air conditioner is just turned on, in order to ensure the comfort of the user, factors such as the quick start time and the temperature of the air outlet must be considered comprehensively in order to achieve the rapid cooling of the air conditioner.

At present, in the design of air conditioners, due to noise limitation and other reasons, when the air conditioner is at the highest 100% wind level, the operating rotating speed of the motor (such as 1120 rpm) is far lower than the maximum rotating speed (such as 1700 rpm) that can be achieved by the indoor fan, thereby affecting the cooling effect and cooling speed of the air conditioner.

SUMMARY

The main object of the present application is to provide a control method of an air conditioner, which aims to shorten the cooling time of an indoor environment and improve the comfort of users.

To achieve the above object, the present application provides a control method of an air conditioner, including the following operations:

detecting a current indoor ambient temperature value under a rapid cooling operation mode;

judging whether the indoor ambient temperature value is greater than a preset temperature value;

if yes, determining a first temperature interval in which the indoor ambient temperature value is located;

determining a corresponding rapid cooling rotating speed value of an indoor fan of the air conditioner according to the first temperature interval, where the rapid cooling rotating speed value is greater than a highest preset rotating speed value of the indoor fan of the air conditioner; and controlling the indoor fan of the air conditioner to operate according to the rapid cooling rotating speed value.

In some embodiments, before the operation of detecting a current indoor ambient temperature value under a rapid cooling operation mode, the method further includes:

dividing the temperature value greater than a preset temperature value into a plurality of temperature intervals, and each of the plurality of temperature intervals corresponds to one rapid cooling rotating speed value; where the first temperature interval is one of the plurality of temperature intervals.

In some embodiments, each of the plurality of temperature intervals corresponds to a calculation formula for a rapid cooling rotating speed value.

In some embodiments, the rapid cooling rotating speed value increases as the indoor ambient temperature value increases.

In some embodiments, the control method of the air conditioner further includes:

acquiring a limit rotating speed value of the indoor fan of the air conditioner; and taking the limit rotating speed value as the rapid cooling rotating speed value corresponding to a second temperature interval, where temperature values in the second temperature interval are greater than temperature values in other temperature intervals.

In some embodiments, the operation of determining a corresponding rapid cooling rotating speed value of an indoor fan of the air conditioner according to the first temperature interval includes:

acquiring a number M of temperature intervals between an upper limit value of the first temperature interval and the preset temperature value; and determining the rapid cooling rotating speed value corresponding to the first temperature interval according to the number M of the temperature intervals and the highest preset rotating speed value of the indoor fan.

In some embodiments, the operation of determining the rapid cooling rotating speed value corresponding to the first temperature interval according to the number M of the temperature intervals and the highest preset rotating speed value of the indoor fan includes:

determining the rapid cooling rotating speed value corresponding to the first temperature interval according to the number M of the temperature intervals, the highest preset rotating speed value of the indoor fan, and the limit rotating speed value.

In some embodiments, the more the number M of the temperature intervals, the more the rapid cooling rotating speed value corresponding to the first temperature interval increases relative to the highest preset rotating speed value of the indoor fan.

In some embodiments, the rapid cooling rotating speed value increases in accordance with a certain proportional relationship as the indoor ambient temperature value increases.

In some embodiments, the temperature intervals are divided by acquiring a parameter set by a user.

In some embodiments, the limit rotating speed value is determined by acquiring a parameter set by the user.

In some embodiments, the control method of the air conditioner further includes:

detecting an operation time of the indoor fan of the air conditioner under the rapid cooling operation mode; and controlling the air conditioner to exit the rapid cooling operation mode on condition that the operation time is longer than a preset time.

In addition, in order to achieve the above object, the present application further provides a control device of an air conditioner, including: a memory, a processor, and a computer program stored in the memory and operable on the processor, where the computer program, when executed by the processor, implements the operations of any of the control methods of the air conditioner as described above.

In addition, in order to achieve the above object, the present application further provides an air conditioner, including the control device of the air conditioner as described above.

In addition, in order to achieve the above object, the present application further provides a computer-readable storage medium, where the computer-readable storage medium stores a control program of an air conditioner, and the control program of the air conditioner, when executed by a processor, implements the operations of any of the control methods of the air conditioner as described above.

According to a control method of an air conditioner provided by an embodiment of the present application, a current indoor ambient temperature value is detected under a rapid cooling operation mode; it is judged whether the indoor ambient temperature value is greater than a preset temperature value; if yes, it may be considered that the current indoor ambient temperature is relatively high, and a first temperature interval in which the indoor ambient temperature value is located is determined; a corresponding rapid cooling rotating speed value of an indoor fan of the air conditioner is determined according to the first temperature interval, where the rapid cooling rotating speed value is greater than a highest preset rotating speed value of the indoor fan of the air conditioner; and the indoor fan of the air conditioner is controlled to operate according to the rapid cooling rotating speed value. In the above manner, the rotating speed of the indoor fan may be adaptively increase as the indoor ambient temperature value rises, so as to achieve a rapid decrease in the indoor ambient temperature and improve user comfort.

The implementation, functional features and advantages of the objects of the present application will be further described with reference to the accompanying drawings.

DETAILED DESCRIPTION OF THE EMBODIMENTS

It should be understood that the specific embodiments described herein are only used to explain the present application and are not intended to limit the present application.

A main solution consistent with embodiments of the present application is: a current indoor ambient temperature value is detected under a rapid cooling operation mode; it is judged whether the indoor ambient temperature value is greater than a preset temperature value; if yes, a first temperature interval in which the indoor ambient temperature value is located is determined; a corresponding rapid cooling rotating speed value of an indoor fan of the air conditioner is determined according to the first temperature interval, where the rapid cooling rotating speed value is greater than a highest preset rotating speed value of the indoor fan of the air conditioner; and the indoor fan of the air conditioner is controlled to operate according to the rapid cooling rotating speed value.

In the conventional technologies, the highest preset rotating speed of the indoor fan of the air conditioner is far from the maximum rotating speed that the indoor fan can reach, thereby affecting the cooling effect and cooling speed of the air conditioner.

The present application provides a solution, the rotating speed of the indoor fan may be adaptively increased as the indoor ambient temperature value rises, so as to achieve a rapid decrease in the indoor ambient temperature and improve user comfort.

Figure 1:
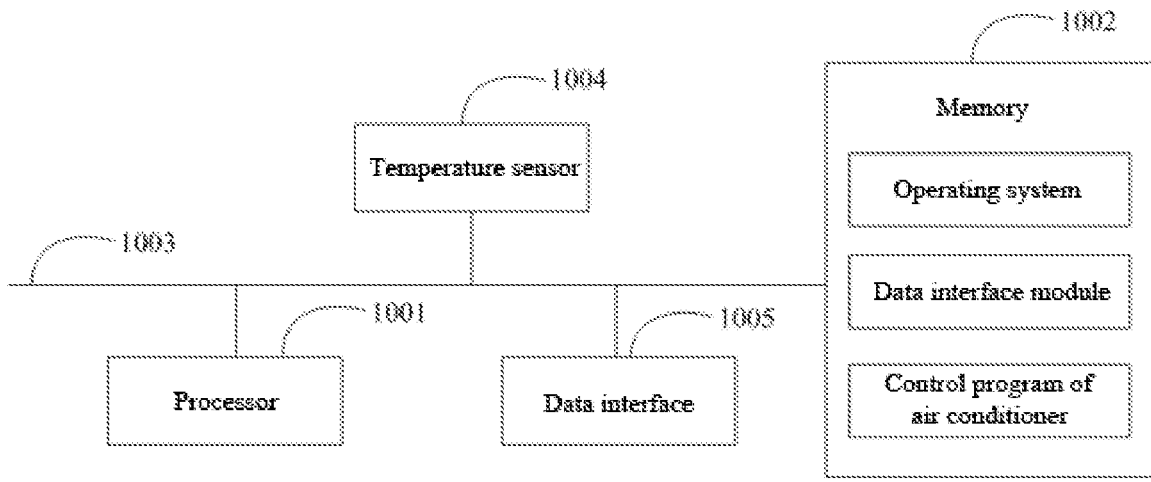
FIG. 1 is a schematic diagram of a device structure of a hardware operation environment according to an embodiment of the present application.

FIG. 1 is a schematic diagram of a device structure of a hardware operating environment according to an embodiment of the present application.

The device consistent with embodiments of the present application may be a personal computer (PC), or may be a terminal device such as a smart phone, a tablet computer, a portable computer, or a smart watch, or may be an air conditioner. Hereinafter an air conditioner is described as an example of the device for illustration.

As shown in FIG. 1, the air conditioner may include a processor 1001, such as a central processing unit (CPU), a memory 1002, a communication bus 1003, a temperature sensor 1004, and a data interface 1005. The communication bus 1003 is used to implement connection and communication between these components. The memory 1002 may be a high-speed random-access memory (RAM) or a non-volatile memory, such as a disk memory. The memory 1002 may optionally be a storage device independent of the foregoing processor 1001. The temperature sensor 1004 may be a thermocouple, a thermistor, a resistance temperature detector, an integrated circuit (IC) temperature sensor, or the like. The data interface 1005 may also include a standard wired interface (such as a universal serial bus (USB) interface or an input/output (IO) interface) and a wireless interface (such as a WI-FI interface).

The temperature sensor 1004 of the air conditioner may be set at the air return port of the air conditioner to detect the current indoor ambient temperature value.

Those skilled in the art may understand that the device structure shown in FIG. 1 does not constitute a limitation on the device, and more or fewer components may be included than shown in FIG. 1, or some components may be combined, or different components may be arranged.

As shown in FIG. 1, a memory 1002 as a computer storage medium may include an operating system, a data interface module, and a control program of an air conditioner.

In the terminal shown in FIG. 1, the processor 1001 may be used to call a control program of an air conditioner stored in the memory 1002, and perform the following operations:

detecting a current indoor ambient temperature value under a rapid cooling operation mode;

judging whether the indoor ambient temperature value is greater than a preset temperature value;

if yes, determining a first temperature interval (also referred to as a "first operation temperature interval") in which the indoor ambient temperature value is located (i.e., a first temperature interval including the indoor ambient temperature value);

determining a corresponding rapid cooling rotating speed value of an indoor fan of the air conditioner according to the first temperature interval, where the rapid cooling rotating speed value is greater than a highest preset rotating speed value of the indoor fan of the air conditioner; and controlling the indoor fan of the air conditioner to operate according to the rapid cooling rotating speed value.

Further, the processor 1001 may call the control program of the air conditioner stored in the memory 1002, and further perform the following operations:

dividing the temperature values greater than a preset temperature value into a plurality of temperature intervals, and each of the plurality of temperature intervals corresponds to one rapid cooling rotating speed value; where the first temperature interval is one of the plurality of temperature intervals.

Further, the processor 1001 may call the control program of the air conditioner stored in the memory 1002, and further perform the following operations:

Increasing the rapid cooling rotating speed value as the indoor ambient temperature value increases.

Further, the processor 1001 may call the control program of the air conditioner stored in the memory 1002, and further perform the following operations:

acquiring a limit rotating speed value of the indoor fan of the air conditioner; and taking the limit rotating speed value as the rapid cooling rotating speed value corresponding to a second temperature interval (also referred to as a "second operation temperature interval"), where temperature values in the second temperature interval are greater than temperature values in other temperature intervals.

Further, the processor 1001 may call the control program of the air conditioner stored in the memory 1002, and further perform the following operations:

acquiring a number M of temperature intervals between an upper limit value of the first temperature interval and the preset temperature value, where M is a positive integer; and determining the rapid cooling rotating speed value corresponding to the first temperature interval according to the number M of the temperature intervals and the highest preset rotating speed value of the indoor fan.

Further, the processor 1001 may call the control program of the air conditioner stored in the memory 1002, and further perform the following operations:

acquiring a number M of temperature intervals between an upper limit value of the first temperature interval and the preset temperature value; and determining the rapid cooling rotating speed value corresponding to the first temperature interval according to the number M of the temperature intervals and the highest preset rotating speed value of the indoor fan.

Further, the processor 1001 may call the control program of the air conditioner stored in the memory 1002, and further perform the following operations:

detecting an operation time of the indoor fan of the air conditioner under the rapid cooling operation mode; and controlling the air conditioner to exit the rapid cooling operation mode on condition that the operation time is longer than a preset time.

Figure 2:
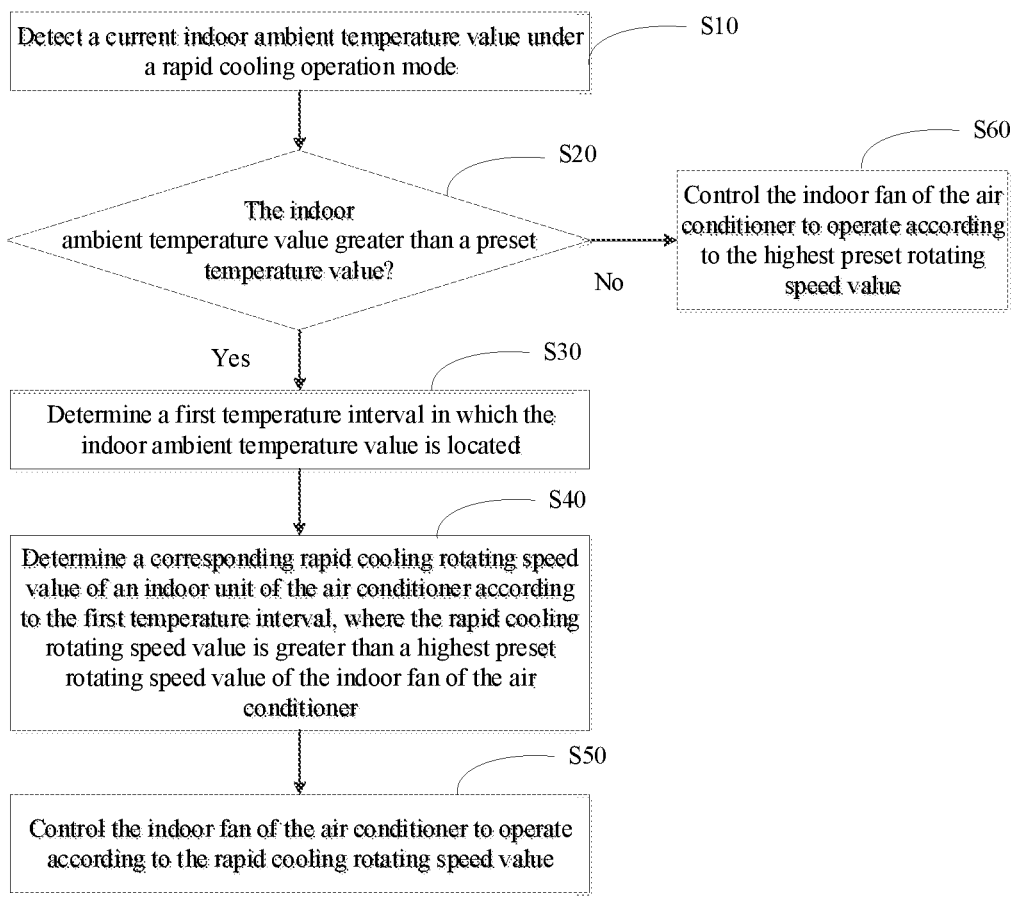
FIG. 2 is a schematic flowchart of a control method of an air conditioner according to an embodiment of the present application.

FIG. 2 shows an example control method of an air conditioner consistent with embodiments of the disclosure, including:

S10: detecting a current indoor ambient temperature value under a rapid cooling operation mode;

The rapid cooling operation mode is a type of air conditioner operation mode. Under the rapid cooling operation mode, the air conditioner may decrease the temperature of the indoor environment in which the air conditioner is located in a short time to reach the user's target temperature value. Each component of the air conditioner including the indoor fan adjusts the operating parameters to achieve a rapid drop in indoor ambient temperature. The rapid cooling operation mode may be turned on by the user's command to the air conditioner. For example, it may be generated by the user's control of the keys on the remote control or the keys on the panel of the air conditioner, or by the user's voice command. The above keys include physical keys and/or virtual keys. When the user needs the air conditioner to rapidly cool the indoor environment, the user issues a related command. After receiving the command from the user, the air conditioner enters the rapid cooling operation mode. In addition, the rapid cooling operation mode may also be that when it is detected that the indoor ambient temperature is higher than a certain set temperature, the air conditioner automatically enters the rapid cooling operation mode, so that the air conditioner may intelligently adapt to the indoor ambient temperature and perform rapid cooling, thus improving user comfort.

The current indoor ambient temperature value may be obtained by detecting the return air temperature of the indoor unit of the air conditioner, for example, by setting a temperature sensor at the return air outlet of the indoor unit of the air conditioner. Or, the indoor ambient temperature value may also be detected by a temperature sensor provided on another device in the indoor environment where the air conditioner is located, for example, by a temperature sensor on a wearable device (such as a wristband) worn by the user. The temperature detected by the wearable device is the user's ambient temperature, which is more accurate.

S20: judging whether the indoor ambient temperature value is greater than a preset temperature value;

The preset temperature value is used as a criterion for determining whether the indoor fan needs to further increase the rotating speed based on the highest preset rotating speed value. If the current indoor ambient temperature value is greater than the preset temperature, it may be considered that the current indoor ambient temperature is relatively high, and the cooling effect is poor even if the indoor fan operates at the highest preset rotating speed value, the rotating speed needs to be further increased to shorten the cooling time, and the following operations S30, S40 and S50 are performed. If the current indoor ambient temperature value is lower than or equal to the preset temperature, it may be considered that the cooling effect is good when the indoor fan operates at the highest preset rotating speed, and the requirement of rapid cooling under the current operating conditions may be achieved, then the following operation S60 is performed. In some embodiments, the preset temperature value may be set to 26° C.

S30: determining a first temperature interval in which the indoor ambient temperature value is located;

S40: determining a corresponding rapid cooling rotating speed value of an indoor fan of the air conditioner according to the first temperature interval, where the rapid cooling rotating speed value is greater than a highest preset rotating speed value of the indoor fan of the air conditioner;

In order to reduce the energy consumption of the air conditioner, temperature values greater than a preset temperature value may be divided into a plurality of temperature intervals in advance, and each temperature interval may correspond to one rapid cooling rotating speed value. The rapid cooling rotating speed value is greater than the highest preset rotating speed of the indoor fan of the air conditioner. Here, the highest preset rotating speed value is the highest rotating speed value that the indoor fan is restricted to not exceed during the normal operation of the air conditioner. Specifically, the highest preset rotating speed value may be the highest rotating speed value that the indoor fan of the air conditioner is not allowed to exceed under certain noise standards or energy consumption standards. The specific value of the rapid cooling rotating speed value corresponding to each temperature interval may be set according to the actual needs of the user, as long as it can meet the user's needs without exceeding the maximum rotating speed at which the indoor fan itself can reliably operate.

In addition, each temperature interval may correspond to specific values, or may correspond to a calculation method. According to the calculation method, the rapid cooling rotating speed value corresponding to the corresponding temperature interval may be determined. The calculation method may be a calculation method formed according to the number of the temperature intervals, the temperature range of the temperature interval, the current operating rotating speed of the indoor fan, the noise limit values, user settings and/or other parameters and the rapid cooling rotating speed value, and specifically, the calculation method may be a formula, an algorithm, etc. Through this calculation method, the user may set the temperature range, the target indoor ambient temperature, the cooling speed of the air conditioner, the acceptable noise limit parameters etc. according to actual needs. The indoor fan of the air conditioner may adjust adaptively based on different parameters set by the user.

Since there is a corresponding relationship between the above temperature interval and the rapid cooling rotating speed of the indoor fan of the air conditioner, it is only necessary to determine the first temperature interval in which the detected current indoor ambient temperature value is located to acquire a suitable rapid cooling rotating speed of the indoor fan.

S50: controlling the indoor fan of the air conditioner to operate according to the rapid cooling rotating speed value.

When the indoor fan of the air conditioner operates according to the foregoing determined rapid cooling rotating speed value, the cooling speed of the air conditioner is increased, compared to the cooling speed of the air conditioner when the indoor fan operates according to the highest preset rotating speed value, so as to achieve rapid cooling of the air conditioner.

S60: controlling the indoor fan of the air conditioner to operate according to the highest preset rotating speed value.

When the indoor ambient temperature value is lower than or equal to the preset temperature value, the cooling effect of the indoor fan of the air conditioner operating at the highest preset rotating speed is good enough, which may meet the rapid cooling requirements under the current working conditions while meeting the original restrictions of the air conditioner.

For example, when the preset temperature value is 26° C., the temperature intervals may be (26° C., 28° C.) (i.e., higher than 26° C. and lower than 28° C.), [28° C., +∞) (i.e., equal to or higher than 28° C.), the highest preset rotating speed value of the indoor fan of the air conditioner is 1120 r/min; the rapid cooling rotating speed value corresponding to the temperature interval (26° C., 28° C.) is 1228 r/min; and the rapid cooling rotating speed value corresponding to the temperature interval [28° C., +∞) is 1450 r/min. When the indoor ambient temperature is lower than or equal to 26° C., the indoor fan of the air conditioner operates at 1120 r/min, when the indoor ambient temperature is in the (26° C., 28° C.) interval, the indoor fan of the air conditioner operates at 1228 r/min; and when the indoor ambient temperature value is in the [28° C., +∞) interval, the indoor fan of the air conditioner operates at 1450 r/min.

According to a control method of an air conditioner provided by the present disclosure, a current indoor ambient temperature value is detected under a rapid cooling operation mode; it is judged whether the indoor ambient temperature value is greater than a preset temperature value; if yes, it may be considered that the cooling effect of the air conditioner is relatively poor, and a first temperature interval in which the indoor ambient temperature value is located is determined; a corresponding rapid cooling rotating speed value of an indoor fan of the air conditioner is determined according to the first temperature interval, where the rapid cooling rotating speed value is greater than a highest preset rotating speed value of the indoor fan of the air conditioner; and the indoor fan of the air conditioner is controlled to operate according to the rapid cooling rotating speed value, so as to improve the cooling speed of the air conditioner. If no, it may be considered that the cooling effect of the air conditioner is relatively good, and the indoor fan of the air conditioner is controlled to operate according to the highest preset rotating speed value, and the rapid cooling effect of the air conditioner may also be ensured. The rotating speed of the indoor fan may be adaptively increased as the indoor ambient temperature value rises, so as to achieve a rapid decrease in the indoor ambient temperature and improve user comfort.

Figure 3:
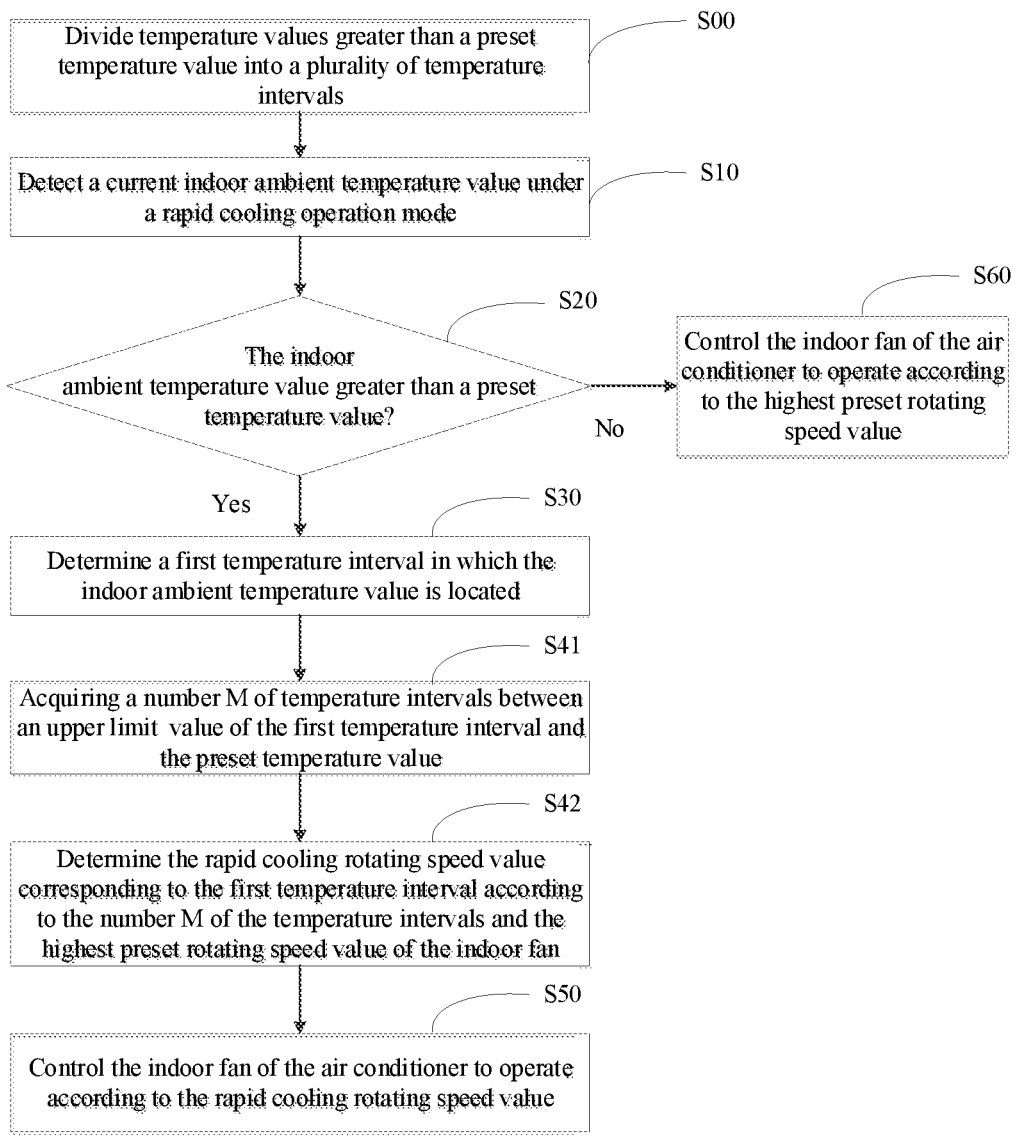
FIG. 3 is a schematic flowchart of the control method of the air conditioner according to another embodiment of the present application.

FIG. 3 shows another example control method of the air conditioner consistent with embodiments of the present application. In this embodiment, before the operation of detecting a current indoor ambient temperature value, the method further includes:

S00, dividing the temperature values greater than a preset temperature value into a plurality of temperature intervals, and each of the plurality of temperature intervals corresponds to one rapid cooling rotating speed value, where the first temperature interval is one of the plurality of temperature intervals.

The temperature values greater than a preset temperature value are divided into a plurality of temperature intervals, and the temperature range of the temperature interval may be set according to the actual using situation. In some embodiments, the temperature range of each temperature interval is equal or similar. For example, the preset temperature value is 26° C., and the temperature intervals may be (26° C., 27° C.] (i.e., higher than 26° C. and lower than or equal to 27° C.), (27° C., 28° C.] (i.e., higher than 27° C. and lower than or equal to 28° C.), (28° C., 29° C.] (i.e., higher than 28° C. and lower than or equal to 29° C.), etc. The temperature intervals may be continuous temperature intervals or discontinuous temperature intervals. When the temperature intervals are continuous temperature value intervals, each detected indoor ambient temperature value may have a corresponding rapid cooling rotating speed value. The temperature intervals may be set according to the user's setting parameters, such as the temperature range within each temperature interval, the number of the temperature intervals, and/or the limit values of the temperature interval. According to the user's setting parameters, the temperature values greater than the preset temperature value are divided into a plurality of temperature intervals, where the greater the number of temperature intervals, the stronger the adaptability of the rapid cooling control of the indoor fan of the air conditioner. The first temperature interval in which the current indoor ambient temperature is located is one of the foregoing temperature intervals.

Each temperature interval acquired by the above division corresponds to one rapid cooling rotating speed value. The rapid cooling rotating speed value may vary according to the number of temperature intervals, the temperature range within each temperature interval, the current operating parameters of the indoor fan, the user comfort parameters etc. The rapid cooling rotating speed value increases as the temperature value increases so that the rotating speed of the indoor fan may be adaptively adjusted for different indoor ambient temperature values.

Although the rapid cooling rotating speed value determined when the indoor ambient temperature value is greater than the preset temperature value is greater than the highest preset rotating speed value of the indoor fan, the rapid cooling rotating speed value cannot be infinitely large. On the one hand, the reliable operation of the indoor fan will have a limitation on the rotating speed value, on the other hand, the increase of the rotating speed value of the indoor fan will be accompanied by the amplification of adverse factors such as noise that affect user comfort. Therefore, the rapid cooling rotating speed value corresponding to each temperature interval should be less than the limit rotating speed value of the indoor fan. The limit rotating speed value may be the maximum rotating speed that can be achieved when the indoor fan of the air conditioner operates reliably, or it may be the maximum rotating speed of the indoor fan according to the user's comfort parameters, such as the acceptable maximum noise decibel value.

In some embodiments, the limit rotating speed value may be determined by acquiring the comfort parameters set by the user. The limit rotating speed value is taken as the rapid cooling rotating speed value corresponding to the second temperature interval, where the temperature values in the second temperature interval are greater than the temperature values in other temperature intervals. The second temperature interval may be determined by comparing the temperature values in the foregoing plurality of temperature intervals, and the temperature interval with the highest temperature values is used as the second temperature interval, so that the indoor fan of the air conditioner operates at the limit rotating speed value when the temperature is the highest, so as to achieve rapid cooling with the best effect while guarantee user comfort requirements.

Based on the foregoing division of the temperature intervals, specifically, the operation of determining a corresponding rapid cooling rotating speed value of an indoor fan of the air conditioner according to the first temperature interval includes:

S41: acquiring a number M of temperature intervals between an upper limit value of the first temperature interval and the preset temperature value;

S42: determining the rapid cooling rotating speed value corresponding to the first temperature interval according to the number M of the temperature intervals and the highest preset rotating speed value of the indoor fan.

The corresponding relationship between the rapid cooling rotating speed value and the highest preset rotating speed value of the indoor fan, the number of the temperature intervals, and the first temperature interval in which the indoor ambient temperature is located is established, so that the user may set the temperature intervals according to the using needs. As such, the indoor fan may intelligently and adaptively adjust the rapid cooling rotating speed value with the change of the indoor ambient temperature to achieve the requirement of rapid cooling. Specifically, the form of the corresponding relationship may be a formula, an algorithm, etc. The first temperature interval in which the current indoor ambient temperature value is located may be determined according to the current indoor ambient temperature value. The increase amount of the rapid cooling rotating speed value relative to the highest preset rotating speed value may be determined by judging the number M of temperature intervals between the upper limit value of the first temperature interval and the preset temperature value. The rotating speed value of the indoor fan may be increased according to the determined increase amount, and it may be used as the rapid cooling rotating speed value corresponding to the first temperature interval. In some embodiments, the corresponding relationship can be that, the more temperature intervals between the upper limit value of the first temperature interval and the preset temperature value, the larger the increase amount of the rapid cooling rotating speed value corresponding to the first temperature interval relative to the highest preset rotating speed value of the indoor fan of the air conditioner. The rapid cooling rotating speed value increases with the increasing of the indoor ambient temperature value, and the specific increase value may be increased according to a fixed amount, a certain proportional relationship, or other irregular ways.

On the basis of the above, the rapid cooling rotating speed value may also establish a corresponding relationship with the highest preset rotating speed value of the indoor fan, the limit rotating speed value, the number of temperature intervals, and the first temperature interval in which the indoor ambient temperature value is located. The rapid cooling rotating speed value corresponding to the first temperature interval may be determined according to the number M of the temperature intervals, the highest preset rotating speed value of the indoor fan, and the limit rotating speed value of the indoor fan.

Specifically, $N = N_{min} \pm (N_{max} - N_{min}) \times M/Q$ may be used as a formula for calculating the rapid cooling rotating speed value, where N is the rapid cooling rotating speed value corresponding to the first temperature interval, $N_{min}$ is the highest preset rotating speed value of the indoor fan, $N_{max}$ is the limit rotating speed value, and Q is the total number of all temperature intervals greater than the preset temperature value. Through the above method, as the indoor ambient temperature value increases, the rapid cooling rotating speed value may be increased proportionally based on the temperature interval. For example, the preset temperature value is 26° C., and the total number of temperature intervals above the preset temperature value is 5. The operating parameters of the rotating speed value of the indoor fan when the current indoor ambient temperature is 24.5° C., 26.5° C., 27.5° C., 28.5° C., 29.5° C., and 30.5° C. respectively are shown in Table 1 below.

TABLE 1

| Preset temperature interval | Current indoor ambient temperature | M | Rotating speed value of indoor fan |
|---|---|---|---|
| (−∞, 26° C.] | 24.5° C. | | $N_{min}$ |
| (26° C., 27° C.] | 26.5° C. | 1 | $N_{min} + 1/5 (N_{max} - N_{min})$ |
| (27° C., 28° C.] | 27.5° C. | 2 | $N_{min} + 2/5 (N_{max} - N_{min})$ |
| (28° C., 29° C.] | 28.5° C. | 3 | $N_{min} + 3/5 (N_{max} - N_{min})$ |
| (29° C., 30° C.] | 29.5° C. | 4 | $N_{min} + 4/5 (N_{max} - N_{min})$ |
| (30° C., +∞) | 30.5° C. | 5 | $N_{max}$ |

In addition to the above calculation formulas, other calculation formulas may be set according to different requirements or fitting methods, which will not be repeated here.

In the above manner, the temperature values greater than the preset temperature value may be divided into a plurality of temperature intervals by acquiring the user's setting parameters. Each temperature interval corresponds to a rapid cooling rotating speed value. The rapid cooling rotating speed value increases with the increasing of the indoor ambient temperature value. In the foregoing temperature intervals, the first temperature interval in which the indoor ambient temperature value is located is determined. The rapid cooling rotating speed value may be determined according to the number M of temperature intervals between the upper limit value of the first temperature interval and the preset temperature value, and the highest preset rotating speed value of the indoor fan. As a result, the rapid cooling rotating speed value of the indoor fan may be adjusted adaptively according to the different settings of the user, so that the air conditioner may be intelligently achieve rapid cooling while ensuring that the individual needs of the user are met.

Figure 4:
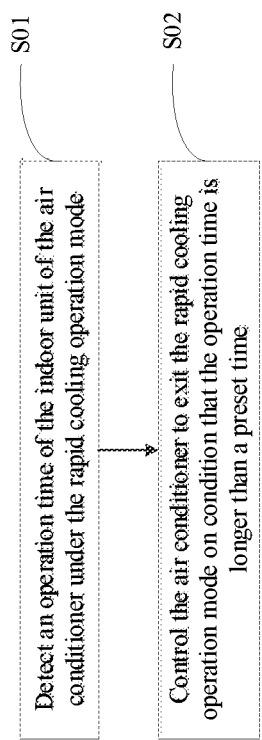
FIG. 4 is a schematic flowchart of the control method of the air conditioner according to another embodiment of the present application.

FIG. 4 shows another example control method of the air conditioner consistent with embodiments of the present application. In this embodiment, the control method of the air conditioner may further include the following operations:

S01: detecting an operation time of the indoor fan of the air conditioner under the rapid cooling operation mode;

S02: controlling the air conditioner to exit the rapid cooling operation mode on condition that the operation time is longer than a preset time.

The operation time of the rapid cooling operation mode of the air conditioner may be controlled by setting a preset time. The preset time may be set by the user according to actual needs. The operation time of the indoor fan of the air conditioner under the rapid cooling operation mode is detected, if the operation time is longer than the preset time, it may be considered that the air conditioner does not need to perform rapid cooling and can be controlled to exit the rapid cooling operation mode; when the operation time is shorter than or equal to the preset time, it may be considered that the air conditioner still needs to perform rapid cooling to meet the user's comfort needs.

In addition, the operation time of the rapid cooling operation mode of the air conditioner may also be controlled by comparing the current indoor ambient temperature value with the target temperature value of the air conditioner set by the user, when the indoor ambient temperature value is lower than or equal to the target temperature, it may be considered that the indoor ambient temperature has been able to meet the user's comfort needs, and no rapid cooling of the air conditioner is needed; when the indoor ambient temperature is greater than the target temperature value, it may be considered that the indoor ambient temperature still does not meet the user's comfort needs, and the air conditioner is still required to maintain the current rapid cooling operation mode.

Through the above methods, the air conditioner may automatically control the operation time of the rapid cooling operation mode according to the user's needs, so as to improve the user experience.

In addition, the present application further provides a control device of an air conditioner, including: a memory, a processor, and a computer program stored in the memory and operable on the processor, where the computer program, when executed by the processor, implements the operations of the control method of the air conditioner as described above. The control device of the air conditioner may be a terminal such as a smart phone, a remote controller, a computer, a tablet computer, a smart watch, or a controller such as a microcontroller.

In addition, the present application further provides an air conditioner, including the control device of the air conditioner as described above and the indoor fan. The foregoing control device may be provided outside the air conditioner and communicating with the air conditioner, or may also be provided inside the air conditioner and directly connected to components such as a compressor, a condenser, and an outdoor fan of the air conditioner.

In addition, the present application also provides a computer-readable storage medium, where the computer-readable storage medium stores a control program of an air conditioner, and the control program of the air conditioner, when executed by a processor, implements the operations of the control methods of the air conditioner as described above.

It should be noted that, in this article, the terms "including," "comprising" or any other variants thereof are intended to cover non-exclusive inclusion, so that a process, method, article or system including a series of elements includes not only those elements, but also includes other elements that are not explicitly listed, or elements that are inherent to such a process, method, article, or system. Without more restrictions, an element limited by the sentence "including a . . . " does not exclude the existence of other identical elements in the process, method, article, or system that includes the element.

The sequence numbers of the foregoing embodiments of the present application are merely for description, and do not represent the superiority or inferiority of the embodiments.

Through the description of the above embodiments, those skilled in the art can clearly understand that the methods in the above embodiments can be implemented by means of software plus a necessary universal hardware platform, and of course, also by hardware, but in many cases the former is better. Based on these understanding, the technical solution of the present application can be embodied in the form of a software product. The computer software product is stored in a storage medium (such as ROM/RAM, magnetic disk, optical disc) as described above, including a number of instructions to enable a terminal device (can be a mobile phone, a computer, a server, an air conditioner, or a network device, etc.) to execute the methods described in the embodiments of the present application.

The above descriptions are only about illustrative embodiments of the present disclosure, and are not intended to limit the scope of the present disclosure. Any equivalent structural or process transformation made by using the description and drawings of the present disclosure or direct/indirect disclosure in other related technical fields under the inventive concept of the present disclosure are included in the scope of the present disclosure.

What is claimed is:

1. A control method of an air conditioner comprising:
dividing temperature values greater than a preset temperature value into a plurality of temperature intervals, each of the plurality of temperature intervals corresponding to one of a plurality of rapid cooling rotating speed values of an indoor fan of the air conditioner in a rapid cooling operation mode;
acquiring a limit rotating speed value of the indoor fan;
setting one of the plurality of rapid cooling rotating speed values that corresponds to a highest temperature interval to be equal to the limit rotating speed value, the highest temperature interval being a temperature interval having a highest temperature among the plurality of temperature intervals;
detecting an indoor ambient temperature value under the rapid cooling operation mode;
judging whether the indoor ambient temperature value is greater than a preset temperature value; and in response to the indoor ambient temperature value being greater than the present temperature value:
    determining an operation temperature interval, the operation temperature interval being one of the plurality of temperature intervals that encompasses the indoor ambient temperature value;
    determining an operation rapid cooling rotating speed value of the indoor fan, the rapid cooling rotating speed value being one of the plurality of rapid cooling rotating speed values that corresponds to the operation temperature interval and being greater than a highest preset rotating speed value of the indoor fan, and determining the operation rapid cooling rotating speed value including:
        acquiring a number M of temperature intervals between an upper limit value of the operation temperature interval and the preset temperature value, M being a positive integer; and
        determining the operation rapid cooling rotating speed value corresponding to the operation temperature interval according to the number M, the highest preset rotating speed value, and the limit rotating speed value; and
    controlling the indoor fan to operate according to the operation rapid cooling rotating speed value.

2. The control method according to claim 1, wherein each of the plurality of temperature intervals corresponds to a calculation formula for the corresponding rapid cooling rotating speed value.

3. The control method according to claim 2, wherein the operation rapid cooling rotating speed value increases as the indoor ambient temperature value increases.

4. The control method according to claim 1, wherein the limit rotating speed value is determined according to a parameter set by the user.

5. The control method according to claim 1, wherein a difference between the operation rapid cooling rotating speed value corresponding to the operation temperature interval and the highest preset rotating speed value increases with increasing the number M.

6. The control method according to claim 5, wherein the operation rapid cooling rotating speed value corresponding to the operation temperature interval increases in accordance with a proportional relationship as the indoor ambient temperature value increases.

7. The control method according to claim 1, further comprising:
    detecting an operation time of the indoor fan under the rapid cooling operation mode; and
    controlling the air conditioner to exit the rapid cooling operation mode in response to the operation time being longer than a preset time.

8. The control method according to claim 1, wherein the plurality of temperature intervals are determined according to a setting parameter from a user.

9. The control method according to claim 1, further comprising:
    detecting an operation time of the indoor fan under the rapid cooling operation mode; and
    controlling the air conditioner to exit the rapid cooling operation mode in response to the operation time being longer than a preset time.

10. A control device of an air conditioner comprising:
    a processor; and
    a memory storing a computer program that, when executed by the processor, causes the processor to:
        divide temperature values greater than a preset temperature value into a plurality of temperature intervals, each of the plurality of temperature intervals corresponding to one of a plurality of rapid cooling rotating speed values of an indoor fan of the air conditioner in a rapid cooling operation mode;
        acquire a limit rotating speed value of the indoor fan;
        set one of the plurality of rapid cooling rotating speed values that corresponds to a highest temperature interval to be equal to the limit rotating speed value, the highest temperature interval being a temperature interval having a highest temperature among the plurality of temperature intervals;
        detect an indoor ambient temperature value under the rapid cooling operation mode;
        judge whether the indoor ambient temperature value is greater than a preset temperature value; and
        in response to the indoor ambient temperature value being greater than the present temperature value:
            determine an operation temperature interval, the operation temperature interval being one of the plurality of temperature intervals that encompasses the indoor ambient temperature value;
            determine an operation rapid cooling rotating speed value of the indoor fan, the rapid cooling rotating speed value being one of the plurality of rapid cooling rotating speed values that corresponds to the operation temperature interval and being greater than a highest preset rotating speed value of the indoor fan, and determining the operation rapid cooling rotating speed value including:
                acquiring a number M of temperature intervals between an upper limit value of the operation temperature interval and the preset temperature value, M being a positive integer; and
                determining the operation rapid cooling rotating speed value corresponding to the operation temperature interval according to the number M, the highest preset rotating speed value, and the limit rotating speed value; and
            control the indoor fan to operate according to the operation rapid cooling rotating speed value.

11. The air conditioner comprising: the control device according to the claim 10; and the indoor fan.

12. A non-transitory computer-readable storage medium storing a control program of an air conditioner that, when executed by a processor, causes the processor to:
    divide temperature values greater than a preset temperature value into a plurality of temperature intervals, each of the plurality of temperature intervals corresponding to one of a plurality of rapid cooling rotating speed values of an indoor fan of the air conditioner in a rapid cooling operation mode;
    acquire a limit rotating speed value of the indoor fan;
    set one of the plurality of rapid cooling rotating speed values that corresponds to a highest temperature interval to be equal to the limit rotating speed value, the highest temperature interval being a temperature interval having a highest temperature among the plurality of temperature intervals;
    detect an indoor ambient temperature value under the rapid cooling operation mode;
    judge whether the indoor ambient temperature value is greater than a preset temperature value; and
    in response to the indoor ambient temperature value being greater than the present temperature value:

determine an operation temperature interval, the operation temperature interval being one of the plurality of temperature intervals that encompasses the indoor ambient temperature value;

determine an operation rapid cooling rotating speed value of the indoor fan, the rapid cooling rotating speed value being one of the plurality of rapid cooling rotating speed values that corresponds to the operation temperature interval and being greater than a highest preset rotating speed value of the indoor fan, and determining the operation rapid cooling rotating speed value including:

acquiring a number M of temperature intervals between an upper limit value of the operation temperature interval and the preset temperature value, M being a positive integer; and determining the operation rapid cooling rotating speed value corresponding to the operation temperature interval according to the number M, the highest preset rotating speed value, and the limit rotating speed value; and control the indoor fan to operate according to the operation rapid cooling rotating speed value.

\* \* \* \* \*